United States Patent Office 2,815,556
Patented Dec. 10, 1957

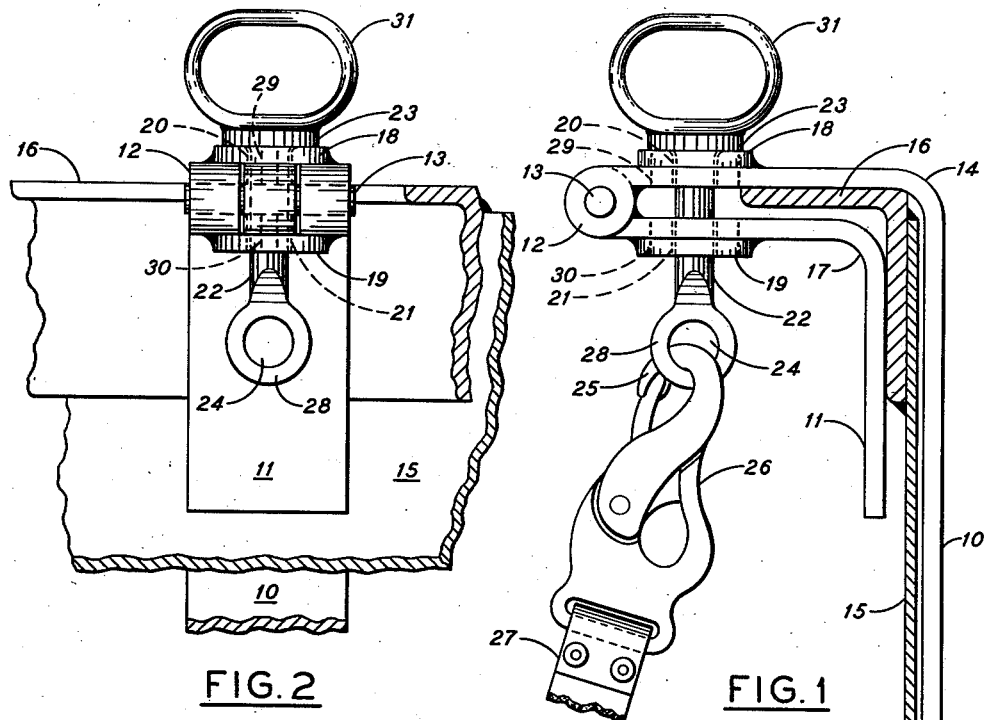
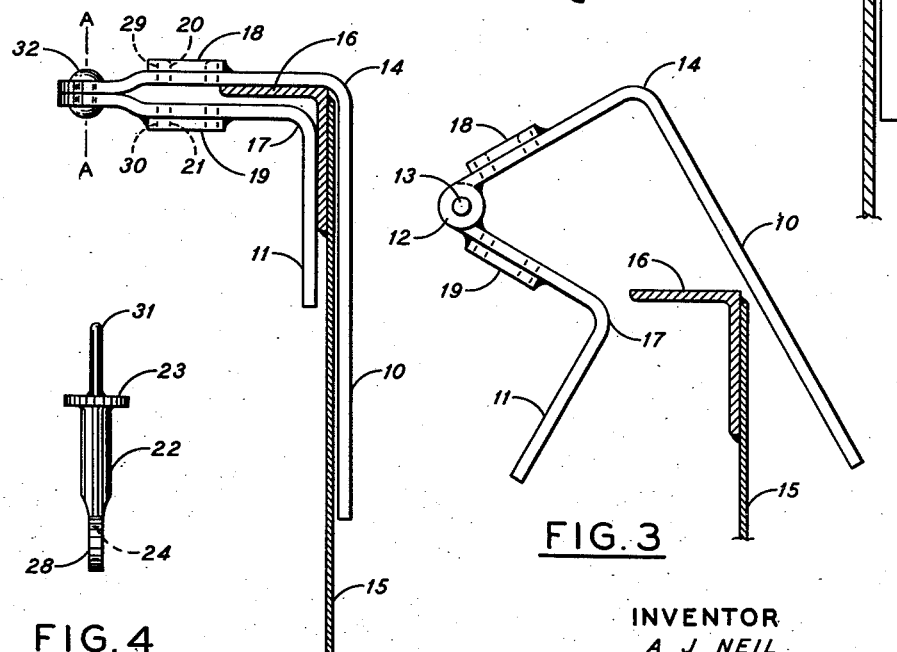

2,815,556

SAFETY BELT CLAMP

A. J. Neil, El Segundo, Calif., assignor, by mesne assignments, to California Research Corporation, San Francisco, Calif., a corporation of Delaware Application August 10, 1955, Serial No. 527,543

1 Claim. (Cl. 24—248)

This invention relates to a clamp for detachably securing a workman's safety belt to an elevated structure on which he may be working, and particularly refers to one adapted to be secured to the flanged rim of a circular, open-topped, petroleum or other liquid storage tank so that the workman may move about the outer walkway of the tank without hazard of falling and without disconnecting the clamp from the tank structure.

Present designs of large steel storage tanks for liquids, and particularly petroleum, include what are known as "floating" roofs, which rest upon the liquid and rise and fall with changes in the liquid level. The top rim of the tank shell of such a unit is generally surmounted by an outwardly directed stiffening flange, usually provided by an angle section that surrounds the rim. To facilitate working on the tank shell, there is usually a walkway for workmen outside of and a few feet below the tank rim. To provide a permanent guard rail for this walkway, which is used only infrequently, would entail considerable expense, so that such structures are usually without such a railing and consequently expose a workman to the hazard of falling.

This invention is particularly, although not necessarily, directed to a clamp engageable with a flanged tank rim of this nature which is readily shifted about the tank circumference during normal movements of a workman, but which is engaged by a connection to his safety belt in such a manner that it cannot accidentally be removed or dislodged. Similarly, it may also be used on other structures that provide an angle member to which the clamp may be secured. Additionally, it may be so arranged that, even without the connection to the safety belt, it can be locked or secured to the angle support and cannot be dislodged by vibration or accidental contact with hoisting equipment or the like to constitute a hazard to workmen below.

It is an object of this invention to provide an improved clamp for connecting a workman's safety belt to a tank rim or other flanged structure.

Another object is to provide a pivoted clamp that may be readily attached to or detached from its support, and which is securely and automatically locked against removal by connection to the worker's safety belt.

Another object is to provide a pivoted clamp with a removable, headed pin that may serve to lock the clamp in position in the absence of the safety belt connection just discussed.

Another object is to provide a simple and inexpensive safety clamp that may be fabricated from relatively simple parts and in which all parts are accessible for inspection and maintenance for continued safe operation.

These and other objects and advantages will be further apparent from the following description taken in connection with the attached drawing, which forms a part of this specification and illustrates a preferred and an alternative embodiment of the invention.

In the drawing,

Figure 1 is a vertical side elevational view of a clamp in place on a tank rim, showing a safety belt hook attached.

Figure 2 is a vertical front elevational view of the arrangement of Figure 1, but without the safety belt attached.

Figure 3 is a vertical side elevational view similar to Figure 1, showing an opened clamp being placed over or removed from a tank rim.

Figure 4 is a detail side elevational view of a preferred form of locking pin for any of the clamps illustrated.

Figure 5 is a vertical side elevational view of a clamp utilizing an alternative form of pivoted connection between the bent parallel bars.

Referring to the drawings and particularly to Figures 1 and 2, reference numeral 10 designates an elongated first bar, usually of iron or steel, which is pivotally connected at one end to a second bar 11 by means such as a hinge 12, through which is a pin 13. Bar 10 is bent at right angles at point 14 to enclose the angle between the vertical inner face of tank shell 15 and the horizontal top face of the angle member 16 at the top rim of the tank. Similarly, the second bar 11 is bent at 17 to lie below the top leg of angle member 16 and outside of the tank shell, as shown best in Figure 1. Thus, the two parallel bars 10 and 11, with the pivotal connection and the bends 14 and 17, form a clamp that encloses the top flanged rim of the tank shell 15.

To retain the clamp thus formed in locked position on the tank rim, bars 10 and 11 are provided, in this example, with welded bosses 18 and 19 which are drilled as at 20 and 21 to form aligned apertures for a pin generally designated 22 to pass through when both bars are in closed position. Head 23 on pin 22 serves to prevent it from dropping entirely through apertures 20 and 21. An opening 24 adjacent the free end of pin 22 is adapted to receive the hook portion 25 of a conventional spring connector 26 of a safety belt (not shown) to which it is joined by a strap 27.

Desirably, but not necessarily, the end of pin 22 at the opening 24 is flattened as at 28 to be wider than the shank of pin 22. To permit passage of this wider portion through apertures 20 and 21 in bosses 18 and 19, the latter are slotted as at 29 and 30. Referring now to Figure 2, it will be noted that the construction just described will serve to lock the clamp on angle member 16 and tank shell 15, in the absence of the hooked spring connector 26, by giving pin 22 a quarter turn. A loop or handle 31 on pin 22 will serve to indicate the position of pin 22, as well as to act as a convenient means for sliding the whole assembly circumferentially around the tank rim without detaching it therefrom.

Figure 3 illustrates how the clamp arrangement of Figures 1 and 2 is opened, by removing pin 22, so that it may be placed over the angle 16 and shell 15 to assume the closed position, whereupon pin 22 is inserted through aligned apertures 20 and 21 to receive the hook 25 of connector 26, as just described. Removal of the clamp from the rim is accomplished by first disconnecting the connector 26 and withdrawing pin 22, whereupon the pivoted bars are opened, as shown.

Alternatively to the transverse hinge 12 of the arrangement of Figure 1, the pivoted connection between the end of bars 10 and 11 may be made as shown in Figure 5, wherein a rivet 32 joins those members. The inner or lower bar 11 is then swung around the axis A—A of rivet 32 with respect to the upper or outer bar 10, to permit installation and removal of the clamp by a straight downward or upward motion. When the bars are in alignment, pin 22 may be inserted through the apertures 20 and 21 to lock the clamp onto the tank rim or other structure.

In conclusion, it is considered that this invention comprehends broadly the provision of a pair of bent parallel bars, pivotally connected at one end to form a clamp selectively movable to closed or open positions over a flanged tank rim or other angular structure, with a headed pin adapted to lock the parts together, and, if desired, to receive a cooperating part of a safety belt connector to secure the pin in locked position with respect to the bar members. Although only two embodiments have been shown and described, it is obvious that modifications could be made in several of the elements shown, and all such changes as come within the scope of the appended claim are intended to be embraced thereby.

I claim:

A device for detachably securing a safety belt to a flanged top rim of a vertical, downwardly directed wall, such as a tank shell, comprising a pair of parallel bars, a pivoted connection for the bars at one end thereof, each of said bars being bent at right angles intermediate its ends to form a clamp movable to open and closed positions, an aperture in each bar between said bend and said pivoted connection and equidistant from the latter, and a headed pin adapted to extend downwardly through said apertures when said clamp is in closed position over said flanged rim, the alignment of said apertures and said pin cooperating to prevent movement of said bars about said pivoted connection which would tend to open said clamp, and an opening in the lower end of said pin adapted to receive the hook of a safety belt.

References Cited in the file of this patent

UNITED STATES PATENTS

| | | |
|---|---|---|
| 574,547 | Lewis | Jan. 5, 1897 |
| 1,108,431 | Farnum | Aug. 25, 1914 |
| 2,437,331 | Murray | Mar. 9, 1948 |
| 2,647,523 | Vollender | Aug. 4, 1953 |
| 2,677,865 | Moeller | May 11, 1954 |